Oct. 2, 1945.　　M. P. KULP ET AL　　2,386,173
APPARATUS FOR THE PRODUCTION OF ARTIFICIAL FILAMENTS
Filed May 13, 1943　　3 Sheets-Sheet 3
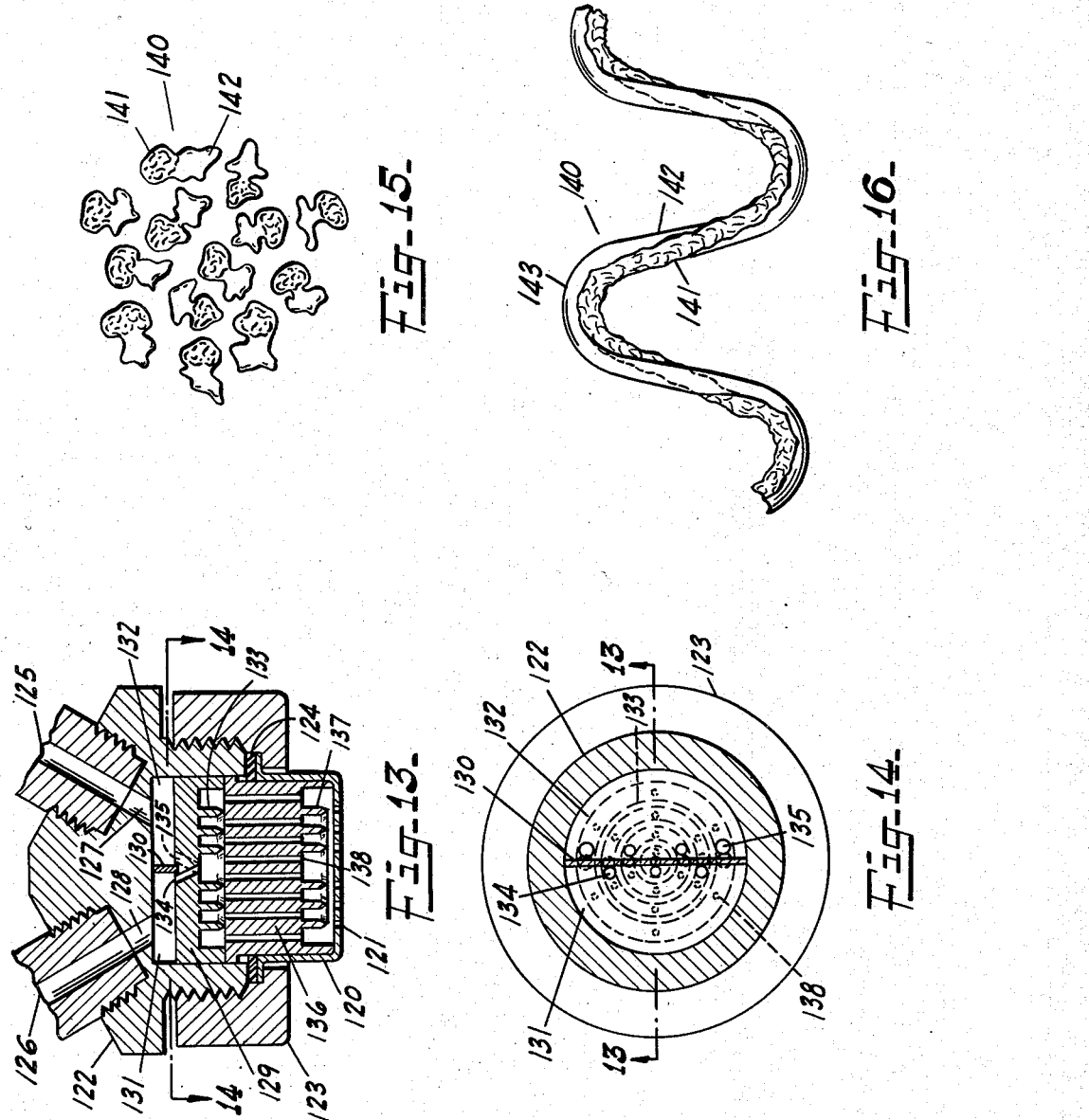
INVENTORS.
MAURICE P. KULP
FREDERICK F. MOREHEAD
WAYNE A. SISSON
WESLEY L. WEBB
BY
ATTORNEY.

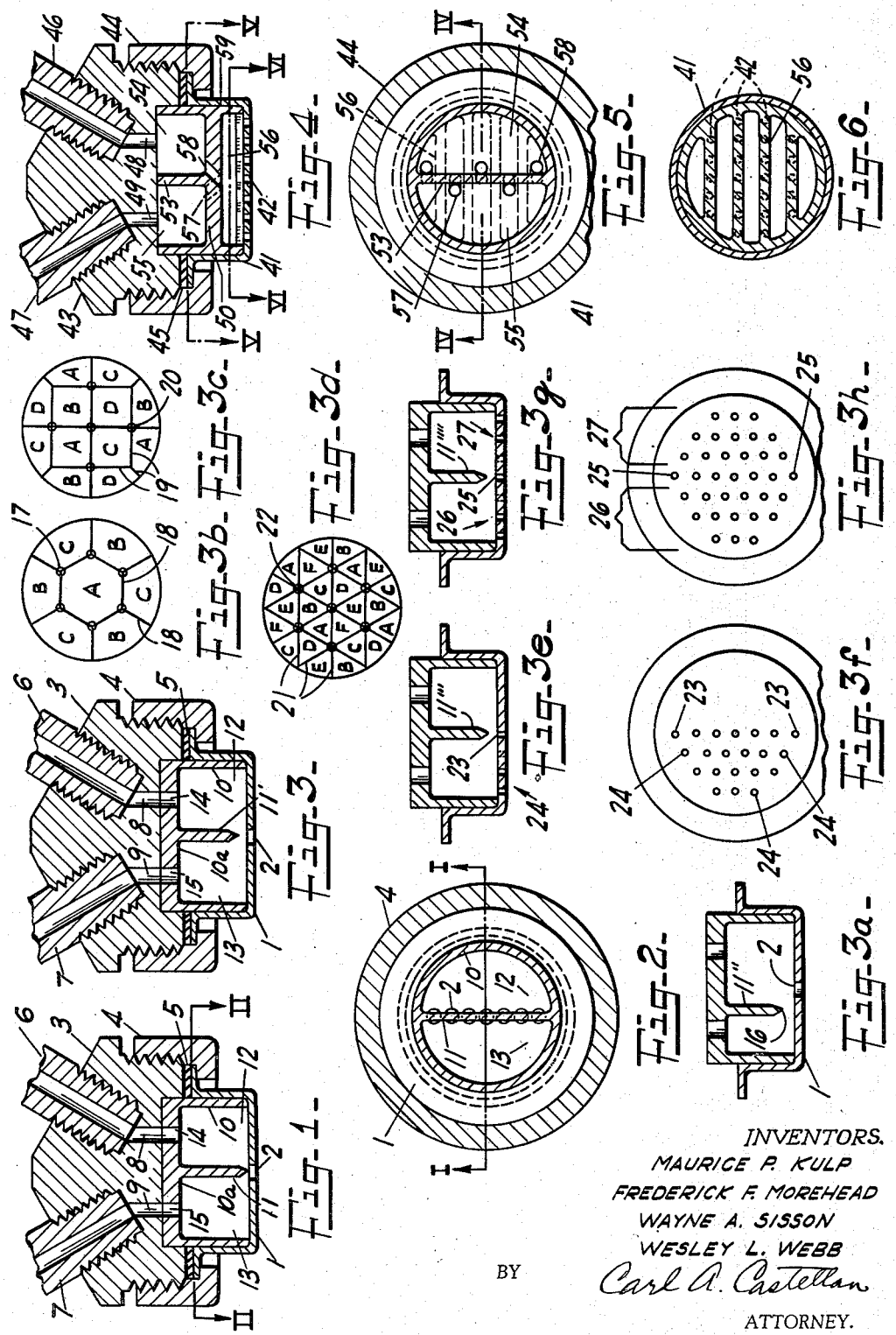

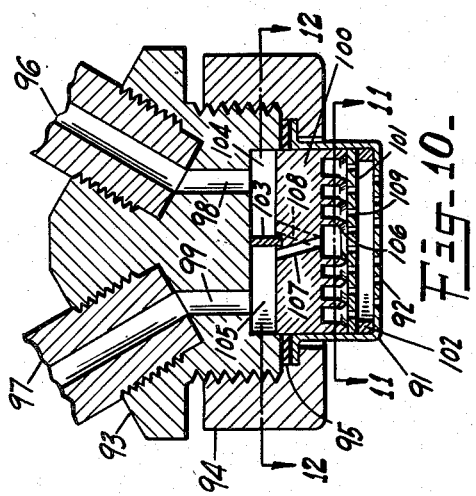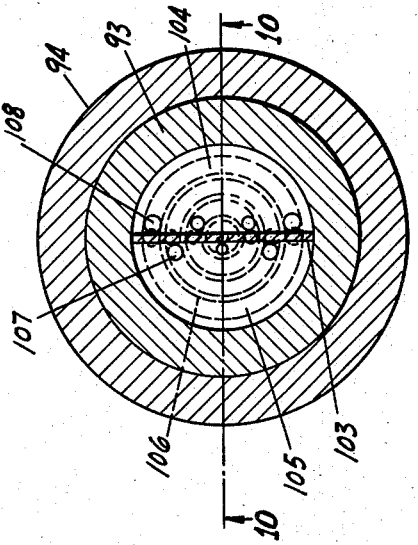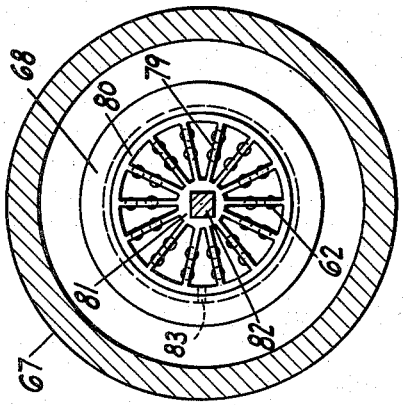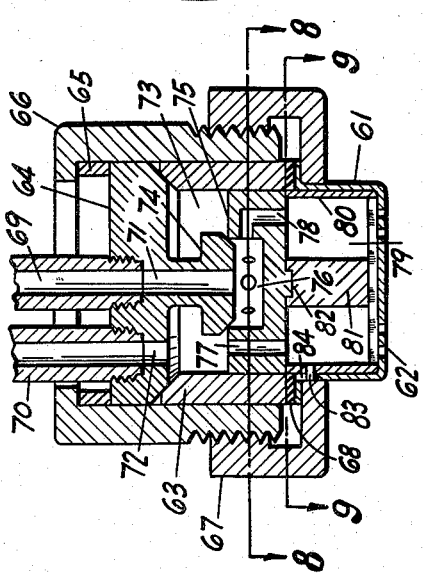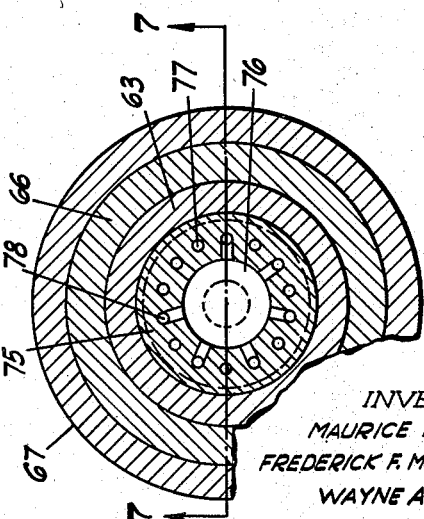

Patented Oct. 2, 1945

2,386,173

UNITED STATES PATENT OFFICE 2,386,173

APPARATUS FOR THE PRODUCTION OF ARTIFICIAL FILAMENTS

Maurice P. Kulp, Linwood, and Frederick F. Morehead, West Chester, Pa., and Wayne A. Sisson, Silverside, Del., and Wesley L. Webb, Glen Moore, Pa., assignors to American Viscose Corporation, Wilmington, Del., a corporation of Delaware Application May 13, 1943, Serial No. 486,774

16 Claims. (Cl. 18—8)

This invention relates to apparatus for producing artificial filaments of composite character. More particularly, this invention relates to improved apparatus for producing composite artificial filaments characterized by an appreciable crimp.

In accordance with the present invention, two or more filament-forming materials of different properties, in a fused or plasticized state or in the form of solutions thereof, are extruded in separate or only partially intermingled phases through a common orifice or a plurality thereof where they are joined together in eccentric or side by side relation into a setting medium which may be either gaseous or liquid functioning either by cooling, precipitating or evaporative effect to form unitary filaments in each of which the different materials form separate portions of the body of the filament.

Any of the filament-forming materials or solutions may be utilized including viscoses, proteins, such as caseins and soya bean proteins, cellulose derivatives such as cellulose acetate and ethyl celluloses, and resins such as nylons, the vinyl resins, especially the copolymers of vinyl chloride and vinyl acetate, and the vinylidene halides. When different cellulose xanthates or viscoses are used, they may differ as to either age, cellulose content, sodium hydroxide content, carbon disulphide content, as to the type of cellulose from which they are made, such as wood pulp or cotton pulp, or as to any two or more of these factors. Where other cellulose derivatives such as the esters or ethers are used they or their solutions may differ as to viscosity, cellulose content, or as to degree of polymerization or substitution of the cellulose chains therein. Where resin solutions are used, the solutions may differ as to kind of resin, viscosity, and the degree of polymerization of the resin. Two spinning materials of different classes may be combined, such as a protein with a viscose, a protein with a cellulose acetate, or a cellulose acetate with a vinyl resin. It is only necessary that the materials in the form employed (fused or in solution) do not mutually precipitate each other and that they adhere together in the final filaments.

The filaments may be extruded into either a liquid or gaseous setting or precipitating medium depending upon the solutions that are used. For instance, viscose solutions may be extruded into an acid precipitating bath and other cellulose derivatives and resins or their solutions may be extruded into either a liquid or a gaseous medium.

When it is desired to produce crimpy filaments, the filaments, shortly after extrusion, are stretched and are either immediately thereafter permitted to relax or, after formation of the filaments, they are plasticized, such as by wetting, in a relaxed condition in order to effect shrinkage. Again, completely set filaments, whether stretched or not during formation, may be subsequently stretched, plasticized and relaxed to effect shrinkage and crimping. Various forms of apparatus may be used for stretching the filaments, a preferred form being positively driven rollers, succeeding rollers being driven at higher speeds, such as shown in United States Patent 1,950,922. Alternatively a thread-storing, thread-advancing device about which the filaments continuously travel in a helical path, the individual convolutions of which become progressively larger, may be used. The stretching procedure orients the micelles or molecules of the several component materials making up the filament to different degrees and, where it is performed as an after-stretching procedure, it is carried to such an extent that at least one, and preferably all components of the filament, is or are stretched beyond the elastic limit so that the filament is in an unbalanced condition and when relaxed and subjected to a shrinking process, the several components of the filament will shrink or contract to different degrees with the result that the filament will have an appreciable crimp which is generally such that the filament takes the form of a regular or irregular helical coil which may reverse itself in direction at more or less frequent intervals of regular or irregular occurrence, and that the eccentic components of the filament follow a helical path about the longitudinal axis of the filament, which path may reverse itself at more or less frequent irregular intervals. The component material undergoing the greater shrinkage during the crimp formation or having the greater elastic recovery after stretching generally forms the inner portions of the filament at the bends of the crimp therein.

The individual crimped filaments produced by the apparatus of this invention in their state of normalcy are characterized by a stabilized condition having an inherent distortion which makes the crimp one of a permanently recoverable character. The filaments, whether crimped or not, have a unitary structure having a cross-section at all points of the filament length which comprises two or more substantially distinct areas each of which has a different composition than that of the others and at least one of which is eccentrically disposed with respect to the filament cross-section. At least two of the component areas are composed of materials having distinct differences in properties and especially in those properties which give rise to differences in shrinkage in response to those influences which can effect shrinkage or in elastic recovery from a stretched condition.

In the drawings, illustrative of the invention,

Figure 1 is a vertical sectional view of a form of apparatus embodying the invention taken on the line 1—1 in Figure 2.

Figure 2 is a sectional view taken on the line 2—2 in Figure 1.

Figure 3 is a vertical sectional view of another form of apparatus embodying the invention.

Figure 3a is a vertical sectional view of another form of apparatus embodying the invention.

Figure 3b is a diagrammatic view illustrating another modification.

Figure 3c is a diagrammatic view illustrating another modification.

Figure 3d is a diagrammatic view illustrating another modification.

Figures 3e and 3f are cross-sectional and face views respectively of another modification.

Figures 3g and 3h are cross-sectional and face views respectively of another modification.

Figure 4 is a vertical sectional view of a further form of apparatus embodying the invention taken on the line 4—4 in Figure 5.

Figure 5 is a sectional view taken on the line 5—5 in Figure 4.

Figure 6 is a sectional view taken on the line 6—6 in Figure 4.

Figure 7 is a vertical sectional view of another form of apparatus embodying the invention taken on the line 7—7 in Figure 8.

Figure 8 is a sectional view taken on the line 8—8 in Figure 7.

Figure 9 is a sectional view taken on the line 9—9 in Figure 7.

Figure 10 is a vertical sectional view of another form of apparatus embodying the invention taken on the line 10—10 in Figure 12.

Figure 11 is a sectional view taken on the line 11—11 in Figure 10.

Figure 12 is a sectional view taken on the line 12—12 in Figure 10.

Figure 13 is a vertical sectional view of another form of apparatus embodying the invention taken on the line 13—13 in Figure 14.

Figure 14 is a sectional view taken on the line 14—14 in Figure 13.

Figure 15 is a view of cross-sections of filaments produced by the invention.

Figure 16 is an elevational view of a crimped filament produced by the invention.

Referring to Figures 1 and 2 of the drawings in which an embodiment of the invention is shown, reference character 1 indicates a spinneret having a plurality of holes 2 spaced apart in a row extending diametrically across the face of the spinneret. The spinneret is attached to a spinning solution supply head 3 by the coupling 4. A gasket 5 is positioned between the flange of the spinneret and the supply head to insure a tight seal. Metered amounts of different spinning solutions are delivered to the supply head by the pipes 6 and 7 which communicate with the passages 8 and 9 in the supply head. A cup-like member is positioned in the space between the spinneret and the supply head with its cylindrical side wall 10 in engagement with the side wall of the spinneret and with its disk-like base 10a in engagement with the supply head. Passageways 14 and 15 are formed in the base 10a of the cup-like member in line with the passages 8 and 9 in the supply head. A septum or rib-like member 11 extends diagonally across the space back of the spinneret face and projects from the base 10a of the cup-like member into contact with the back face of the spinneret so that its edge extends transversely of the orifices 2 therein. The edge of the septum in contact with the back face of the spinneret is preferably sharpened or V-shaped and preferably bisects the entrances of the orifices 2. The septum divides the space back of the orifices in the spinneret into two separate regions one within chamber 12 which communicates with the passages 14 and 8 and feed pipe 6 and the other with chamber 13 which communicates with the passages 15 and 9 and the feed pipe 7. The chamber 12 communicates with one-half of each hole 2 in the spinneret adjacent one side of the septum and the chamber 13 communicates with the other half of each hole 2 adjacent the other side of the septum.

In the operation of this embodiment of the invention, one type of filament-forming material is delivered by the pipe 6 through the passages 8 and 14 to the chamber 12 and another type of filament-forming material is delivered by the pipe 7 through the passages 9 and 15 to the chamber 13. The two types of spinning material are kept separate in the space back of the orifices 2 by the septum 11 but each type passes into each of the holes 2 in the spinneret so that they join together and emerge from the spinneret to form composite unitary filaments of two different types of material.

Figure 3 shows a modification of the embodiment of Figures 1 and 2 in which all parts are the same with the exception that the septum 11 is shorter so that its dividing edge 16 is spaced from the orifices 2 a distance which may be as much as one-fourth to one-half an inch where the most favorable conditions prevail, or as much as from three to six hundredths of an inch even where conditions of excessive turbulence are present. Figure 3a shows a detail of a further modification of the embodiment of Figures 1 to 3 in which all parts are of the same construction with the exception that edge 16" of the septum 11" is not only spaced from the back face of the spinneret 1, but is offset to one side of the orifices 2. The offset relationship between the septum edge 16" and the orifices 2 as shown in Figure 3a does not interfere with the formation of composite filaments since the separate pumps force the spinning materials on both sides of the septum 11" to find egress and the continuous nature of the pressure exerted on the materials causes them both to flow out of the orifices simultaneously in a continuous stream. The permissible distance from the septum edge and the back face of the spinneret and the permissible extent of offset relation between the septum edge and the orifices depends upon the nature of the two spinning materials, chiefly upon their tendency to mix. When the materials are reasonably high in viscosity which is ordinarily the case, these distances may be made of considerable size without producing disruption of either component in the final composite filament. When, however, the materials are of low viscosity, the distances permissible are much smaller. The term "vicinity" is intended to comprehend all such permissible variations. The disposition of the several components within the transverse cross-section of the composite unitary filament may be varied by varying these two distances.

In all cases including those described above and the arrangements to be described hereinafter, the proportion of the cross-section occupied by each of the several component materials may be varied by varying the ratio between their volumetric velocities as supplied by their respective pumps which in turn may be effected by restricting the passages in one or the other of the feeding systems, such as 14 or 15 of Figures 1 to 3, to increase the pressure drop and thereby proportionately decrease the flow of spinning material through that system. Alternatively, constant volume pumps with adjustable outputs may be used to vary the proportion of the components. The proportions of the materials may be varied to any desired extent depending upon what properties are to be emphasized and favored in the final composite filament.

Figures 1 to 3 and 3a illustrate in simple form a way of forming filaments composed of two different filament-forming materials. In Figure 3b, there is shown diagrammatically, an arrangement for forming three-component filaments. The spinneret orifices are indicated at 17 and a complex or branched septum system is provided. Approximately in line with each spinneret hole 17, three of the walls 18 of the septum join to form dihedral angles of 120° between them. The supply head (not shown) is provided with three different supply systems to supply the three spinning materials A, B and C in the several regions in the septum so designated. A central pipe may supply the material A, the supply for each of the other materials B and C being provided with suitable branches or a suitable distributor system to supply the several surrounding regions B and C.

Figure 3c shows a septum arrangement for spinning a four-component filament, the components A, B, C and D being fed by suitable passages into the region designated by the letters A, B, C and D respectively between the walls 19 of the branched septum system. The spinneret holes 20 are arranged to fall on the corners of a square instead of a hexagon as in Figure 3b.

Figure 3d shows a septum system having walls 21 suitable for spinning a six-component filament (or by making two of the components the same, a five component filament). The several regions designated by the letters A, B, C, D, E and F are fed by different spinning materials and flow past the several common junctures of the septa walls to the spinneret holes 22.

Figures 3e and 3f show a modified form of spinneret which may be inserted in place of the spinneret 1 of Figures 1 to 3. Besides the row of holes 23 extending diametrically across the spinneret to cooperate with the septum 11''', there is also provided a number of holes 24 well to one side of the central row. This makes it possible to spin a mixture of filaments, some of which are composite (those issuing from the row of holes 23 in the vicinity of the septum) and some of which are composed of a single spinning material. By properly adjusting the two pumps and the pressure drop through each supply system, the proportions existing between the components of the composite filaments may be varied to any extent desired. Similarly the ratio between the number of holes forming the composite filaments and that of those forming ordinary simple filaments may be changed by using other spinnerets having different numbers of such holes and employing appropriate pumping capacities or pressure drops in the separate supply systems. Again, the denier of the composite filaments may be different from that of the simple filaments, and if desired composite filaments having various deniers as well as simple filaments having various deniers may be spun from a single spinneret in which the orifices are made of the appropriate diameters.

Further possibilities in the production of yarns having novel characteristics arise when employing the spinneret of Figures 3g and 3h in which a row of holes 25 which are arranged to cooperate with the septum 11'''' in such systems as are shown in Figures 1 to 3 produce composite filaments and two groups of holes 26 and 27 disposed on each side of the first row produce simple filaments, those from one group 26 being of one substance and those of the other group 27 being of the other material making up the composite filaments.

Referring to Figures 4, 5 and 6 of the drawings, in which another embodiment of the invention is shown, reference character 41 indicates a spinneret having a plurality of holes 42 spaced apart in parallel rows extending across the face of the spinneret. The spinneret is attached to a spinning solution supply head 43 by the coupling 44. A gasket 45 is positioned between the flange of the spinneret and the supply head to insure a tight seal. Metered amounts of different spinning solutions are delivered to the supply head by the pipes 46 and 47 which communicate with the passages 48 and 49 in the supply head. A distributing member is positioned in the space between the supply head and the spinneret with its outer cylindrical shell 59 fitting within a recess of the supply head 43 and within the side wall of the spinneret. This distributing member is provided with a transverse partition 50 from which a plurality of septa 56 project with their edges in proximity to and aligned with the several rows of holes 42 thereby dividing the space back of the orifices of the spinneret into a plurality of adjacent substantially separate regions as shown in Figure 6. A diametrically arranged web 53 divides the space between the partition 50 and the supply head into two separate regions 54 and 55 communicating with the passages 48 and 49 respectively. Passageways 57 and 58 are formed in the distributor member which communicate with the chambers 55 and 54 respectively and with alternate regions between the several septa 56. While the inlets of the passageways 57 and 58 are on opposite sides of the web 53, the outlets are in a line below the web 53. The bore of the individual passageways 58 are preferably made of the appropriate diameter to supply the same amount of the spinning material to each hole 42 in the spinneret. To do this, the middle bore 58 must be larger than the bores of the outer two passageways 58 since the former feeds more orifices 42.

In the operation of this embodiment of the invention, one type of spinning material is delivered by the pipe 46 through the passage 48 to the chamber 54 and another type of spinning solution is delivered by the pipe 47 through the passage 49 to the chamber 55. The spinning material from the supply pipe 46 passes from the chamber 54 through the passageways 58 and fills alternate regions between the septa 56. The spinning material from the supply pipe 47 passes from the chamber 55 through the passageways 57 and fills the other alternate spaces between the septa 56. The two different spinning materials then pass together through the holes 42 in the spinneret to form composite unitary filaments as explained in more detail above.

Referring to Figures 7, 8 and 9 of the drawings, in which an additional embodiment of the invention is shown, reference character 61 indicates a spinneret provided with a plurality of holes 62 arranged in radial rows. The spinneret is attached to the spinning solution supply head 64 by the coupling member 67 which engages the clamping member 66, the annular spacing members 63 and 65 as well as the gasket 68 cooperating to form a tight seal. The member 64 is formed with a centrally positioned projecting portion 74, which forms the internal wall of an annular chamber 73 and the extremity of which is beveled to form a tight seal with the distributing member 75. The distributor 75 fits closely within the annular member 63 and has a central chamber 76 the rim about which bears in tight sealing engagement against the beveled extremity of the portion 74 of the supply head 64. The distributor 75 is provided with a plurality of passages 78 each having a radially extending portion and an axially extending portion. The distributor is also provided with a plurality of axially extending passages 77 positioned in a circle to alternate between the axially extending portions of the passages 78. A partitioning member comprising a central portion 81 and a cylindrical shell 80 joined together by a plurality of radially extending septa 79 is positioned in the space between the distributor and the inside face of the spinneret with the outer periphery of the shell 80 in engagement with the side wall of the spinneret. The dividing edges of the septa 79 may be spaced back of the radially spaced orifices 62 any slight distance up to the order of several hundredths of an inch by making the edge of the cylindrical shell 80 which abuts against the back face of the spinneret extend beyond the edges of the septa the desired distance. One face of the distributor 75 is provided with a square boss 82 which fits into a recess of corresponding shape in the central portion 81 of the partitioning member to locate it relative to the distributor 75 so that the passages 77 and 78 communicate with alternate spaces between the septa 79. A pin 83 secured to and projecting outwardly from shell 80 cooperates with slot 84 in the side wall of the spinneret 61 to properly locate the spinneret holes 62 with respect to the septa 79. The supply head 64 is provided with a central passage 71 threaded to receive a pipe and an eccentric passage 72 threaded to receive a pipe 70.

In the operation of the embodiment of the invention shown in Figures 7, 8 and 9, one type of spinning material is delivered by the pipe 69 through passageway 71 to the central chamber 76 in the distributor and another type of spinning material is delivered by the pipe 70 through the passageway 72 to the annular chamber 73. The spinning material from the central chamber 76 passes through the passages 78 and fills alternate spaces formed between the septa. Spinning material from the annular chamber 73 passes through the passages 77 and fills the other alternate spaces formed between the septa. The different types of spinning material then pass together through the holes 62 in the spinneret to form composite unitary filaments as described hereinabove.

Referring to Figures 10, 11 and 12 of the drawings in which another embodiment of the invention is shown, reference character 91 indicates a spinneret having a plurality of orifices 92 spaced apart in rings concentric with the center of the spinneret. The spinneret is attached to a spinning solution supply head 93 by the coupling 94. A gasket 95 is positioned between the flange of the spinneret and the supply head to insure a tight seal. Metered amounts of different spinning solutions are delivered to the supply head by the pipes 96 and 97 which communicate with the passages 98 and 99 in the supply head. A distributing member 100 is positioned in the space between the supply head and the spinneret with its outer periphery in contact with the side wall of the spinneret and is spaced from the supply head by the partition 103 which divides the space between the distributor and the supply head into chambers 104 and 105. The other side of the distributor 100 is formed with a plurality of annular septa 106 concentric with the spinneret center. Passageways 107 and 108 are formed in the distributor 100 and communicate with the chambers 105 and 104 respectively and with alternate annular spaces formed between the septa 106. While the inlets of the passageways 107 and 108 are on opposite sides of the partition 103, the outlets are in approximate alignment therewith. The distributor is positioned with the lower extremity of the ring members or septa in contact with a distributor plate 101 which is spaced a short distance, up to the order of several hundredths of an inch, from the back face of the spinneret by the ring 102 so that it is in close proximity to the back face of the spinneret. The distributor plate is provided with a plurality of holes 109 spaced apart in rings concentric with the spinneret center and are preferably, but not necessarily, midway between the septa 106 of the distributor 100. The holes 109 are all of the same order of diameter and are of the proper number to uniformly distribute the filament-forming materials to the numerous orifices 92 in the spinneret. The concentric rows of holes 109 in the distributor plate 101 are also positioned approximately midway between the concentric rows of holes 92 in the spinneret which are positioned in line with the septa.

In the operation of the embodiment of the invention, one type of spinning material is delivered by the pipe 96 through the passage 98 to the chamber 104 and another type of spinning material is delivered by the pipe 97 through the passage 99 to the chamber 105. The spinning material from the supply pipe 96 passes from the chamber 104 through the passages 108 and fills alternate spaces between the septa 106. The spinning material from the supply pipe 97 passes from the chamber 105 through the passages 107 and fills the other alternate annular spaces between the septa 106. The spinning material then passes from the annular spaces between the septa 106 through the holes 109 in the distributor plate 101 and forms alternate rings of the different spinning materials in the space between the distributor plate 101 and the back face of the spinneret. The different spinning materials then pass together through the orifices 92 in the spinneret to form composite unitary filaments. The distributor plate 101 of Figure 10 may be omitted provided arrangement is made to position the edges of the septa 106 in proper proximity to the orifices 92. Distributor plates similar to 101, but having their holes in an appropriately modified special arrangement to cooperate with the arrangement of the spinneret holes and the septa in each particular embodiment, may be provided in other embodiments, such as those of Figures 4 to 6 and Figures 7 to 9.

Referring to Figures 13 and 14 of the drawings in which a further embodiment of the invention is shown, reference character 120 indicates a spinneret provided with a plurality of holes 121 spaced apart in rings concentric with the center of the spinneret. The spinneret is attached to the supply head 122 by the coupling member 123. A gasket 124 is positioned between the flange of the spinneret and the supply head to insure a tight seal. Pipes 125 and 126 communicate with the passages 127 and 128 in the supply head. Distributor 129 and a feeder 136 are positioned in the space between the spinneret and the supply head. The distributor is spaced from the supply head by the partition 130 which extends diametrically across the space between the distributor and the supply head forming the chambers 131 and 132. The other side of the distributor 129 is provided with a plurality of annular partitions 133 concentric with the center of the spinneret which form concentric annular spaces therebetween. The distributor 129 is provided with a plurality of holes 135 which connect alternate annular spaces between the partitions 133 with the chamber 132 and a plurality of holes 134 which connect the other alternate annular spaces between the partitions 133 with the chamber 131. While the inlets of the passageways 134 and 135 are on opposite sides of the partition 130, the outlets are in alignment with it. The bores of passages 134 and 135 are designed to supply the desired proportion of each spinning material uniformly to all of the spinneret orifices 121. The feeder 136 is provided with a plurality of annular septa 137 concentric with the spinneret center which form concentric annular spaces therebetween. The feeder 136 is supported in the assembly by its rim which extends between the peripheral rim of the distributor 129 and the back face of the spinneret. The annular partitions 133 are in contact with the back face of the feeder 136 to prevent intermingling of the spinning materials in this region. The rim of the feeder 136 may be arranged to space the edges of the septa 137 a slight distance of the order of several hundredths of an inch from the back face of the spinneret. A plurality of passages 138 in the feeder connect the annular spaces between the annular partitions 133 on the distributor 129 with the annular spaces between the septa 137. The concentric rings of holes 121 in the spinneret are positioned directly beneath the septa 137 of the feeder 136. The distributor 129 may be omitted from this embodiment if it is not desired to produce a great number of filaments at once. In such event, the feeder would have to be provided with passages like 134 and 135 to cooperate with a partition 130.

In the operation of the embodiment of the invention shown in Figures 13 and 14 of the drawings, one type of spinning material is delivered by the supply pipe 125 through the passage 127 to the chamber 132. Another type of spinning material is delivered by the pipe 126 through the passage 128 to the chamber 131. The spinning material from the supply pipe 125 passes from the chamber 132 through the passagesways 135 and fills alternate annular spaces between the partitions 133 of the distributor. The spinning material from the supply pipe 126 passes from the chamber 131 through the passageways 134 and fills the other alternate annular spaces between the partitions 133 of the distributor 129. The two spinning materials then pass through the passages 138 in the feeder and form alternate rings of the different materials in the spaces between the septa 137 on the feeder and the back face of the spinneret. The different spinning materials then pass together through the holes 121 of the spinneret to form composite unitary filaments.

The spinnerets of Figures 5 to 14 may be provided with additional orifices arranged between the adjacent septa so that those filaments issuing therefrom will be of simple structure, some or all of which will be one of the filament forming materials of the composite filaments and the remainder will be of the other material. As stated previously, a wide range of yarns of different composition may be thus produced by means of a single spinneret and its associated feed system.

The components of the composite filaments produced in accordance with this invention may be partially intermingled adjacent their plane of juncture or they may be substantially free of any mixing at their juncture. The most desirable composite filaments for some purposes are those with relatively little intermingling, but for other purposes those which show considerable intermingling even to the extent of having one of the components entirely encompassed within a portion of the other component, provided such portion is eccentrically related to the final body of the filament are satisfactory.

Referring to Figures 15 and 16 of the drawings showing crimped filaments made by the apparatus of the invention, reference character 140 indicates a filament generally and reference characters 141 and 142 indicate the component portions of the filament which are constituted of different materials. In Figure 16 of the drawings in which the crimp of the filament is shown, reference character 143 indicates one bend of the crimp. Reference character 142 indicates the portion of the filament that is made of the material having the lesser tendency to shrink or less elastic recovery and reference character 141 indicates the portion of the filament that is made of the material having the greater shrinkage tendency or greater elastic recovery. The portion 142 being, in effect, shrunk less than portion 141, portion 142 is of greater length and forms the outside of the bends of the crimp and portion 141 forms the inside of the bends of the crimp. It is to be understood that the crimp is actually of a three-dimensional character and that Figure 16 shows the filament in a single plane.

While it is generally preferable that the unitary filaments comprise equal portions of the different types of material, various proportions of the different types of spinning solutions may be used by adjusting the pumps to control the proportionate amounts of the different types of spinning material that are delivered to the spinneret. Alternatively, the passages of the separate distributing and feeding systems may be designed so that one system imparts a higher pressure drop to the spinning material flowing therethrough than the other in which event the proportions of the different materials will be unequal.

The crimped filaments may be worked into textile fabrics in the form of continuous filament yarns or they may be cut into staple fiber and then subjected to the customary sliver and yarn forming procedures in which they show the peculiar advantages characteristic of crimped fibers. Whereas fibers which have been heretofore crimped by artificial means have failed to exhibit persistence of crimp under certain conditions (for example artificially crimped regenerated cellulose heretofore made would lose its crimp whenever it became wet), the crimp obtained in the composite filaments made by the apparatus of the present invention is substantially completely recovered upon undergoing the conventional form of wetting.

The following example illustrates the use of the apparatus of the invention for the production of permanently crimped composite regenerated cellulose filaments. It is to be understood, however that the spinneret systems of this invention may be used for any purpose whatsoever where it is desired to direct filament forming spinning materials of the same or different character through separate channels to the vicinity of extrusion where juncture occurs to produce a filament of unitary or composite character.

Example

Two different types of viscose solutions are spun, through one of the forms of apparatus shown in the drawing and described above, into a spinning bath containing 10% sulfuric acid, 1% zinc sulfate and 20% sodium sulfate at a temperature of 45° C. One of the types of viscose solution is made from wood pulp using 30% carbon disulfide based on the air dry weight of the pulp and contains 8% cellulose and 6½% sodium hydroxide. This viscose is aged for 48 hours and has a common salt point of 4.8. The other type of viscose solution is made from wood pulp using 30% carbon disulfide based on the air dry weight of the pulp and contains 8% cellulose and 6½% sodium hydroxide. This viscose is aged for 100 hours and has a common salt point of 1.9. The freshly spun filaments are stretched 55% and are then allowed to completely relax. The resulting filaments which are 5.5 denier comprise cellulose regenerated from both types of viscose solution and have 13 crimps per inch.

In the claims hereinafter, "alternate" is intended to refer to one member of a repetitive series of two or greater than two members.

While preferred embodiments of the invention have been shown, it is to be understood that changes and variations may be made without departing from the spirit and scope of the invention as defined by the appended claims.

We claim:

1. An apparatus for producing artificial filaments comprising a spinneret having spaced filament-forming orifices, a septum therein dividing the space back of the orifices into a plurality of substantially separate non-concentric regions any adjacent two of which communicate with each other inside of the spinneret in the vicinity of those of the orifices facing the edge of that portion of the septum which divides the adjacent regions, and conduit means having at least two separate channel systems, each such system being associated with at least one of the regions, for introducing filament-forming material into each of the separate regions.

2. An apparatus for producing artificial filaments comprising a spinneret having spaced filament-forming orifices, a septum therein dividing the space back of the orifices into a plurality of substantially separate non-concentric regions any adjacent two of which communicate with each other inside of the spinneret in the vicinity of those of the orifices facing the edge of that portion of the septum which divides the adjacent regions, and conduit means having separate channel system associated with each of the separate regions for introducing filament-forming material therein.

3. An apparatus for producing artificial filaments comprising a spinneret having spaced filament-forming orifices, a septum therein having one edge extending transversely of a plurality of the orifices, thus dividing the space back of the orifices into a plurality of substantially separate regions any adjacent two of which communicate with those of the orifices facing the edge of that portion of the septum which divides the adjacent regions and conduit means having at least two separate channel systems, each such system being associated with at least one of the regions, for introducing filament-forming material into each of the regions.

4. An apparatus for producing aritificial filaments comprising a spinneret having a plurality of groups of spaced filament-forming orifices and a plurality of septa therein, each septum having an edge extending transversely of the orifices in one of the groups thereof to divide the space back of the orifices into a plurality of substantially separate regions any adjacent two of which communicate with that group of orifices facing the edge of the septum therebetween and conduit means having at least two separate channel systems, each such system being associated with at least one of the regions, for introducing filament-forming material into each of the regions.

5. An apparatus for producing artificial filaments comprising a spinneret having a plurality of groups of spaced filament-forming orifices and a plurality of septa therein, each septum having an edge extending transversely of the orifices in one of the groups thereof to divide the space back of the orifices into a plurality of substantially separate regions any adjacent two of which communicate with that group of orifices facing the edge of the septum therebetween and a plurality of conduit means each having a separate channel system associated with a separate group of alternate regions for introducing filament-forming material therein.

6. An apparatus for producing artificial filaments comprising a spinneret having spaced filament-forming orifices arranged in a plurality of rows, a plurality of septa therein each having one edge extending transversely of the orifices in one of the rows to divide the space back of the orifices into a plurality of substantially separate regions any adjacent two of which communicate with that group of orifices facing the edge of the septum therebetween, and a plurality of conduit means each having a separate channel system associated with a separate group of regions between alternate septa for introducing filament-forming material therein.

7. An apparatus for producing artificial filaments comprising a spinneret having spaced filament-forming orifices arranged in a plurality of parallel rows, a plurality of parallel septa therein each having one edge extending transversely of the orifices in one of the rows to divide the space back of thhe orifices into a plurality of substantially separate regions any adjacent two of which communicate with that group of orifices facing the edge of the septum therebetween, and a plurality of conduit means each having a separate channel system associated with a separate group of regions between alternate septa for introducing filament-forming material therein.

8. An apparatus for producing artificial filaments comprising a spinneret having spaced filament-forming orifices arranged in a plurality of radial rows, a plurality of radial septa therein each having one edge extending transversely of the orifices in one of the rows to divide the space back of the orifices into a plurality of substantially separate regions any adjacent two of which communicate with that group of orifices facing the edge of the septum therebetween, and a plurality of conduit means each having a separate channel system associated with a separate group or regions between alternate septa for introducing filament-forming material therein.

9. An apparatus for producing artificial filaments comprising a spinneret having spaced filament-forming orifices arranged in a plurality of concentric circular rows, a plurality of concentric annular septa therein each having one edge extending transversely of the orifices in one of the rows to divide the space back of the orifices into a plurality of susbtantially separate regions any adjacent two of which communicate with that group of orifices facing the edge of the septum therebetween, and a plurality of conduit means each having a separate channel system associated with a separate group of regions between alternate septa for introducing filament-forming material therein.

10. An apparatus for producing artificial filaments comprising a spinneret having spaced filament-forming orifices arranged in a plurality of rows, a plurality of septa therein each having one edge extending transversely of the orifices in one of the rows to divide the space back of the orifices into a plurality of substantially separate regions any adjacent two of which communicate with that group of orifices facing the edge of the septum therebetween, and a plurality of conduit means each having a separate channel system associated with a separate group of regions between alternate septa for introducing filament-forming material therein, each of the channel systems comprising means for substantially uniformly distributing the filament-forming material introduced thereby to the orifices fed thereby.

11. An apparatus for producing artificial filaments comprising a spinneret having a filament-forming orifice, a transverse partition within the spinneret facing the orifice therein at close proximity, a septum in the spinneret dividing the portion of the space back of the orifice that is back of the partition into substantially separate regions, and passages having diameters of the same order extending from each of the separate regions through the partition to the space back of the inner face of the spinneret.

12. An apparatus for producing artificial filaments comprising a spinneret having a plurality of groups of spaced filament-forming orifices, a transverse partition within the spinneret facing the orifice therein at close proximity, a plurality of septa therein, each septum having its wall extending transversely of the orifices in one of the groups thereof to divide the portion of the space back of the orifices that is back of the partition into a plurality of substantially separate regions, and a plurality of passages having diameters of the same order extending from each of the separate regions through the partition to the space back of the inner face of the spinneret.

13. An apparatus for producing artificial filaments comprising a spinneret having a plurality of concentric circular rows of spaced filament-forming orifices, a transverse partition within the spinneret facing the orifices therein at close proximity, a plurality of concentric annular septa therein, each septum having its wall extending transversely of the orifices in one of the rows to divide the portion of the space back of the orifices that is back of the partition into a plurality of substantially separate regions, and a plurality of passages having diameters of the same order extending from each of the separate regions through the partition to the space back of the inner face of the spinneret.

14. An apparatus for producing artificial filaments comprising a spinneret having a plurality of spaced filament-forming orifices, a septum therein having a branched wall dividing the space back of the orifice into a plurality of substantially separate non-concentric regions any adjacent two of which communicate with each other inside of the spinneret in the vicinity of those of the orifices facing the edge of that portion of the septum which divides the adjacent regions, and conduit means having at least two separate channel systems, each such system being associated with at least one of the regions, for introducing filament-forming material into each of the separate regions.

15. An apparatus for producing artificial filaments comprising a spinneret having a plurality of spaced filament-forming orifices, a septum therein having a branched wall dividing the space back of the orifice into a plurality of substantially separate non-concentric regions any adjacent two of which communicate with each other inside of the spinneret in the vicinity of those of the orifices facing the edge of that portion of the septum which divides the adjacent regions, and conduit means having separate channel systems associated with each of the separate regions for introducing filament-forming material therein.

16. An apparatus for producing artificial filaments comprising a spinneret having spaced filament-forming orifices, at least one septum therein dividing the space back of the orifices into a plurality of substantially separate regions, each septum having one edge extending transversely of and in proximity to certain only of the orifices which thereby communicate directly with the two adjacent regions on both sides of the respective septum, each of the orifices in the spinneret other than those in proximity to a septum edge being disposed laterally away from any septum and opening into a single one of the regions, and conduit means having at least two separate channel systems, each such system being associated with one of the regions, for introducing filament-forming material into each of the regions whereby said certain orifices may receive material simultaneously from a plurality of said channel systems and the remaining orifices may receive material only from a single one of the channel systems.

MAURICE P. KULP.
FREDERICK F. MOREHEAD.
WAYNE A. SISSON.
WESLEY L. WEBB.